United States Patent [19]

Yamaguchi

[11] Patent Number: 5,786,857
[45] Date of Patent: Jul. 28, 1998

[54] IMAGE PROCESSING SYSTEM

[75] Inventor: Hirohisa Yamaguchi, Tsukuba, Japan

[73] Assignee: Texas Instruments Incorporated, Dallas, Tex.

[21] Appl. No.: 864,266

[22] Filed: May 28, 1997

Related U.S. Application Data

[63] Continuation of Ser. No. 316,764, Oct. 3, 1994, abandoned.

[30] Foreign Application Priority Data

Oct. 1, 1993 [JP] Japan ................. 5-246777

[51] Int. Cl.$^6$ ............................. H04N 7/32; H04N 7/30
[52] U.S. Cl. .............. 348/405; 348/408; 348/384; 348/420; 382/239
[58] Field of Search ..................... 348/416, 415, 348/469, 408, 409, 384, 413, 399, 395, 400, 420, 405, 406; 382/56, 232, 239; H04N 7/32, 7/30

[56] References Cited

U.S. PATENT DOCUMENTS

| | | | |
|---|---|---|---|
| 5,311,310 | 5/1994 | Jozawa et al. | 348/416 |
| 5,315,326 | 5/1994 | Sugiyama | 348/409 |
| 5,321,440 | 6/1994 | Yanagihara et al. | 348/469 |
| 5,359,676 | 10/1994 | Fan | 382/56 |
| 5,379,122 | 1/1995 | Eschbach | 348/384 |
| 5,479,211 | 12/1995 | Fukuda | 348/416 |

*Primary Examiner*—Tommy P. Chin
*Assistant Examiner*—Vu Le
*Attorney, Agent, or Firm*—Richard L. Donaldson; William B. Kempler

[57] ABSTRACT

An image-processing system in which harmful noises of image compression are effectively removed. The image processing system includes a transformation device for receiving m pixels×n lines of image information from an input and converting the image information via discrete cosine transformation to data represented in the frequency domain. A quantizer unit forms quantized data based on the frequency domain data received from the transformation device. A reverse quantization unit provides reverse quantized frequency domain data from the quantized data received from the quantizer unit. A second transformation device is connected to the reverse quantization unit for transforming the reverse quantized frequency domain data via inverse discrete cosine transformation to image information. A filtering unit is connected to the second transformation device for filtering the image information from the second transformation device based on the non-zero coefficient parameter. The image processing system is effective for reducing mosquito and block noises in compressed image information.

8 Claims, 7 Drawing Sheets

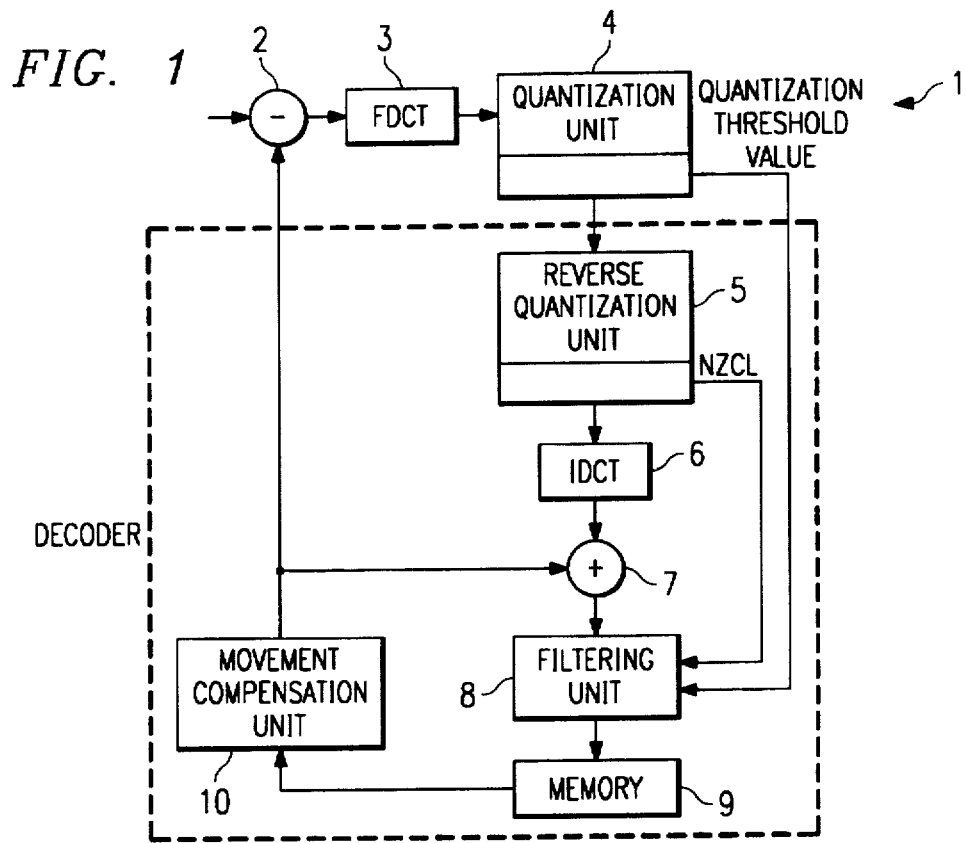

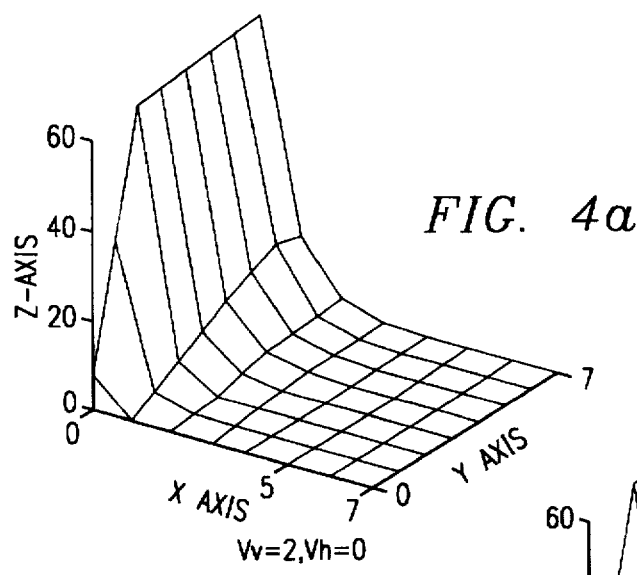
FIG. 4a
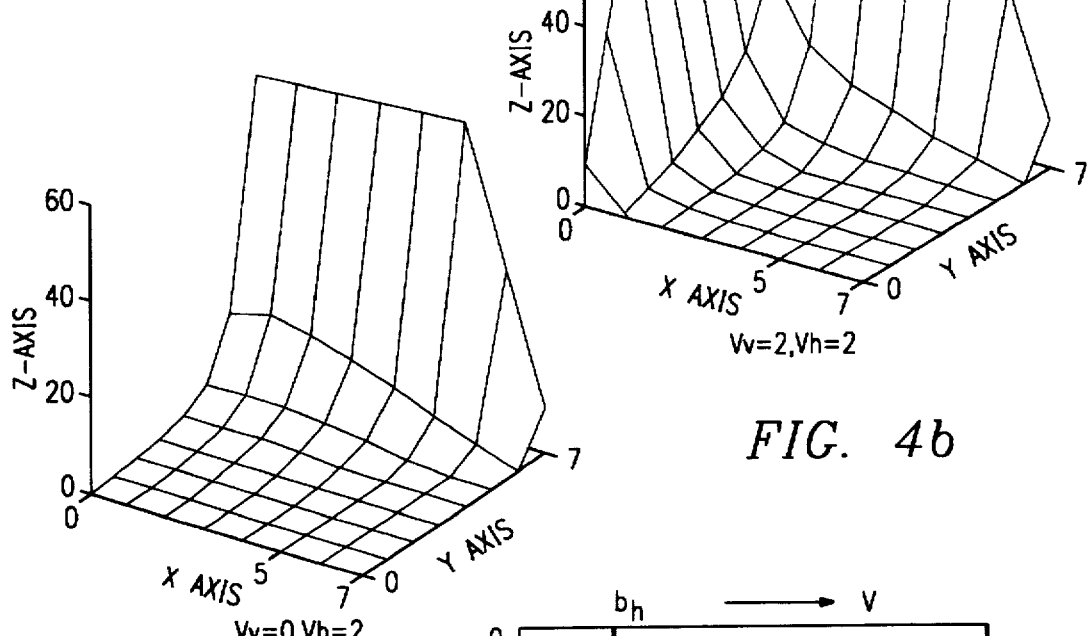
FIG. 4b
FIG. 4c
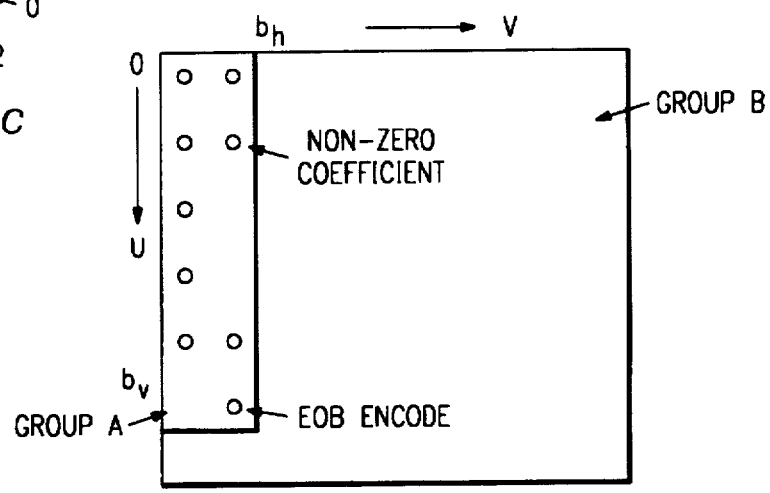
FIG. 7

QUANTIZED SNR=30dB

QUANTIZED SNR=33dB

QUANTIZED SNR=40dB

Vv=0,Vh=1,p=0.8,QSNR=20dB

Vv=0,Vh=2,p=0.8,QSNR=20dB

Vv=1,Vh=0,p=0.8,QSNR=20dB

Vv=1,Vh=0,p=0.1,QSNR=20dB

Vv=3,Vh=3,p=0.1,QSNR=20dB

Vv=3,Vh=3,p=-0.9,QSNR=20dB

IMAGE PROCESSING SYSTEM

This application is a continuation of application Ser. No. 08/316,764, filed Oct. 3, 1994 now abandoned.

This invention pertains to image processing for carrying out digital processing of image information and, in particular, to an image processing system including noise reduction.

BACKGROUND OF THE INVENTION

Various research and development on multimedia systems handling various data, such as images, sounds, etc., in a unified manner have been carried out actively in recent years, and as a result, it has become necessary to store and transmit digitized still and/or moving images. However, if the image information is digitized, the volume of data is very large compared with that of sound data. For example, if 720×480 pixel color moving images are digitized, a high-speed data rate of several 100Mb/sec is required, but to realize it, there are problems with respect to transmission speed and the recording medium.

To solve such problems, the technology of compressing image information has been developed. The international standards are being established, such as CCITT, in the case of a video telephone and audiovisual remote conference, CMTT/2 for television transmissions, in the case of recording media, JPEG (Joint Photographic Expert Group) for still images, and MPEG (Moving Picture Expert Group) for moving image.

Because of highly efficient video compression by orthogonal transformation (e.g., discrete cosine transformation), encoding with movements compensated becoming usable as one of the compression arts, the greatest concerns in recent years are towards removal of characteristic strains (mosquito and block noises) caused by crude quantization of the transformed coefficient. The mosquito noises are hazy noises with a small distance from the edges, and the block noises are block noises generated at the transformation block boundary. Ideas have been proposed previously to solve the problems, but have not been satisfactory.

It is an object of this invention to provide an image processing system in which harmful noises, such as mosquito and block noises, in the case of video compression are substantially reduced.

SUMMARY OF THE INVENTION

The image-processing system in accordance with the invention comprises first transformation means for inputting m pixels x n lines of image information and transforming the image information to data represented in the frequency domain; means for forming quantized data based on the frequency domain data transformed by the first transformation means; reverse quantization means connected to the quantization data formation means; second transformation means connected to the reverse quantization means for transforming the reverse quantized frequency domain data to image information; and filtering means for filtering the image information from the second transformation means based on the non-zero coefficient parameter formed by the reverse quantization means.

BRIEF DESCRIPTION OF THE DRAWINGS

FIG. 1 is a block diagram of an image-processing system in an embodiment of this invention.

FIGS. 2(a) and 2(b) illustrate dispersion of quantized noises within a block.

FIG. 3 is a graph of amplitude in relation to frequency for explaining the quantized noise dispersion of FIGS. 2(a) and 2(b) by power spectra of video signals.

FIGS. 4(a)–4(c) are schematic drawings showing energy spectra of movement-compensated estimated error DCT coefficients.

FIG. 7 is a schematic drawing showing the boundary of coefficients of groups A and B of FIG. 3.

Figure 5A:
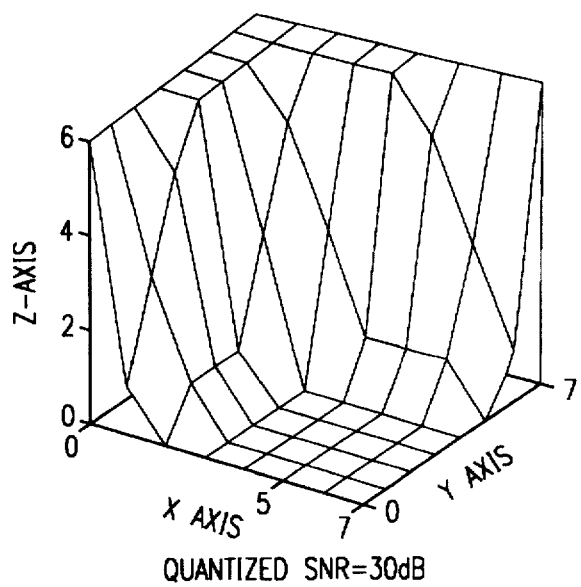
FIGS. 5(a)–5(c) are schematic drawings showing quantized noise spectra.

Reference numerals and symbols as used in the drawings
1: image-processing device, 2: subtracter, 3: FDCT conversion unit, 4: quantization unit, 5: reverse quantization unit, 6: IDCT unit, 7: adder, 8: filtering unit, 9: memory, 10: movement compensation unit

DESCRIPTION OF PREFERRED EMBODIMENT

FIG. 1 is a block diagram of one embodiment of an image-processing system in accordance with the invention. In general, the encoding has a loop structure in moving image compression processing because of movement correction, and this invention also has two practical methods placing the circuit within and outside the loop. It is explained by focusing on the embodiment of FIG. 1 in which the circuit is placed within the loop as follows, and the other case in which the circuit is placed outside the loop (FIG. 11) as explained later. The image-processing system 1 of FIG. 1 includes an FDCT conversion unit 3 inputting image information comprising (8 pixels)×(8lines) blocks through a reducer 2. The FDCT conversion unit 3 converts the image information input to signals represented in the frequency domain by discrete cosine transformation (DCT) and outputs image data showing 64 DCT factors corresponding to the number of pixels to a quantization unit 4. The quantization unit 4 generates quantized data to be output to a reverse quantization unit 5, and in the reverse quantization unit 5, non-zero coefficient parameters (NZCL information) are formed. In the quantization unit 4, a quantization threshold value for a filtering unit 8 is also formed. The reverse quantization unit 5 is connected to an IDCT unit 6, where the reverse-quantized image data is reverse-DCT converted and output to the filtering unit as image information through an adder 7. The filtering unit 8 carries out noise reduction based on the non-zero coefficient parameters from the reverse quantization unit 5. Incidentally, the output of the filtering unit 8 is externally displayed as images, not shown in the figure. Furthermore in this embodiment, the filtering unit 8 receives the quantization threshold value from the quantization unit 4, but it is also possible to input a suitable intermediate value from the outside.

This image-processing system 1 also includes a memory unit 9 and movement compensation unit 10 for movement compensation. The movement compensation unit 10 is to resolve a moving image to blocks of about 16×16 pixels. Subsequently, for each block, a signal having the closest form as a signal is searched from the previous frame signals (in the memory unit 9), for which the encoding has been completed, and an encoded image has been obtained, and by repeating the procedures for the whole frames, the most approximate frame signals to the input frame signals being encoded are synthesized. The synthesized signals are subtracted from the input frame signals (reducer 2) to compress the information, and on the other hand, the information is expanded by adding them (adder 7) after encoding.

The optimization of quantization has been known to be identical to the minimization of the overall signal reproduction error. In this case, the mean square error (MSE) quantized noise can be represented as follows.

$$D = r \sum_{i,j} \sigma^2 2^{-2B_{i,j}} \qquad (1)$$

In equation (1), r is a constant related to a conversion coefficient pdf. In the case of Laplacian pdf to use a Max quantizer, r=4.5, and in the case of Gaussian pdf, r=2.7. Under the condition;

$$B = \frac{1}{N^2} \sum_{i,j} B_{i,j} \qquad (2)$$

the above equation provides a constant value, the minimization of D yields the following equation.

$$B_{i,j} = B + \frac{1}{2} \log \frac{\sigma^2_{i,j}}{\left( \prod_{k,l} \sigma^2_{k,l} \right)^{\frac{1}{N^2}}} \qquad (3)$$

In general in such bit assignment, MSE strains can be shown to be uniformly distributed to all coefficients. When such quantized coefficients are actually to be encoded, those coefficients over the minimum quantization level (threshold value) are to be encoded, and the coefficient numerals not encoded are subsequently encoded as a series of 0s. This threshold value quantization and encoding have been known to be well-suited for video compression to use orthogonal transformation and used in most of the currently available video compression devices.

When 16×16 pixel blocks (called macroblocks, below) are to be quantized, the same quantization step (threshold value), for example, Qstep is used for all four 8×8 blocks (the effects of "quantization weight" are explained later). Respective coefficient $Org_{u,v}$ are quantized to, for example, $Dequant_{u,v}$.

$$Dequant_{u,v} - \frac{Qstep}{2} < Org_{u,v} < DeQuant_{u,v} + \frac{Qstep}{2} \qquad (4)$$

In this case, the arithmetic noises are generally considered to be white. In this case, the reproduced image signals are as follows.

$$Recon^{(1)}_{i,j} = Pred^{(0)}_{i,j} + \sum_{u,v} IDCT_{i,j}(Dequant_{u,v}) \qquad (5)$$

In equation (5), $Pred_{i,j}^{(0)}$ is a value predicted, and $Recon_{i,j}^{(1)}$ is a value reproduced. The true value of the signal $TrueValue_{i,j}$ is, therefore, found somewhere in the following range.

$$Recon^{(1)}_{i,j} - \inf_{-\frac{Qstep}{2} < \theta_{u,v} < \frac{Qstep}{2}} \left( \sum_{u,v} IDCT_{i,j}(\theta_{u,v}) \right) \leq \qquad (6)$$

$$TrueValue_{i,j} \leq Recon^{(1)}_{i,j} +$$

$$\sup_{-\frac{Qstep}{2} < \theta_{u,v} < \frac{Qstep}{2}} \left( \sum_{u,v} IDCT_{i,j}(\theta_{u,v}) \right)$$

In equation (6), $\theta_{u,v}$ is a quantized noise. $\theta_{u,v} = Org_{u,v} - Dequant_{u,v}$, reverse DCT is defined as follows.

$$x(m,n) = \frac{1}{4} \sum_{u=0}^{7} \sum_{v=0}^{7} C(u)C(v)X(u,v)\cos\left(\frac{(2m+1)u\pi}{16}\right) \cos\left(\frac{(2n+1)v\pi}{16}\right) \qquad (7)$$

$$m, n = 0, 1, \ldots, 7$$

In formula (7), C(u or v)=1/sqrt(2) (u or v=0) or =1 (other cases). If the quantized noise (in coefficient space) is white, the dispersion $\sigma^2_{m,n}$ of deencoded noises in the pixel region is given by the following formula.

$$\sigma^2_{m,n} = \frac{1}{16} \sum_{u=0}^{7} \sum_{v=0}^{7} C(u)^2 C(v)^2 \left( \cos\left(\frac{(2m+1)u\pi}{16}\right) \cos\left(\frac{(2n+1)v\pi}{16}\right) \right)^2 E[\theta^2_{u,v}] \qquad (8)$$

If the quantized noise dispersion is equal (quantization of a very small step), for example, $\Theta^2_{u,v} = \Theta^2$ can be shown. For example, $$\sigma_{m,n}^2 = \Theta^2 \text{ (Constant)} \qquad (9)$$

This corresponds to the case in which the dispersion of quantized noises is the same for all the blocks as shown in FIG. 2(a). FIGS. 2(a) and 2(b) are drawings showing quantized noise dispersion within a block. FIG. 2(a) shows white noises having an equal dispersion, and FIG. 2(b) shows white noises having nonlinear effects as a result of the quantization explained below.

If the quantization step becomes large, as is the case in actual video compression, many high-frequency coefficients become smaller than the quantization step height (threshold effects), and when they are quantized, they become 0 coefficients. Quantization noises corresponding to such coefficients are smaller than non-zero quantization coefficients as shown in FIG. 3. FIG. 3 explains it by the power spectrum of video signals. If the power spectrum of typical video signals (solid line in FIG. 3, shown in one dimension) is quantized over the frequency (since DCT coefficients are also frequency components), the results are as shown in the stepped dotted line shown in FIG. 3, but the electric power of noises is different in a portion above and below the threshold value (thick dotted line). Namely, there are two group coefficients, the coefficient of group A contains quantized noises having the same dispersion, and in group B, the dispersion is small. In general, the higher the frequency, the lower the dispersion.

Therefore, there are DCT coefficients for 2 different groups for each quantized block. The coefficient of one group (group A) includes noises having dispersions determined by the quantization step, and the coefficient of the other group (group B) includes relatively small quantized noises.

To carry out a stricter analysis, the power spectrum of each frame of the DCT coefficient is defined by the following equation.

$$[E((s-p)(s-p)')] = [T][R][T]'  \quad (10)$$

In equation (10) [T] is a 64×64 DCT conversion matrix derived from the original 8×8 DCT as a direct product, and s and p are 64-element vectors representing the DCT coefficients of the original block and predicted block. The [R] on the right side of the equation is a correlation matrix for each frame of the original video signals (dispersion=1.0) as shown in the following equation.

$$R_{inter}(i,j) = 2\rho \left| \left(\frac{i}{8}\right) - \left(\frac{j}{8}\right) \right| + \quad (11)$$

$$|i_{mod8} - j_{mod8}|_{-\rho} \left| \left(\frac{i}{8}\right) - \left(\frac{j}{8}\right) + v_x \right| +$$

$$|i_{mod8} - j_{mod8} + v_y|_{-\rho} \left| \left(\frac{i}{8}\right) - \left(\frac{j}{8}\right) - v_x \right| + |i_{mod8} - j_{mod8} - v_y|$$

$$(i,j = 0, \ldots, 63)$$

In equation (11), $\rho$ is a self correlation coefficient of stock image, and $(V_x, V_y)$ is a certain movement in it. It is assumed that the frame differential is generated by a image movement of Markov process as a model. The power spectrum matrix defined by the left side of Equation (10) is represented by $R_{inter}$ below. This 64×64 matrix represents a correlation between pairs of each DCT coefficient, and the diagonal line term shows the dispersion of the DCT coefficient itself. The high-frequency noises can be regarded as to white noises. Such diagonal line term is rearranged in 8×8 raster formula.

$$(\phi^2_{v, \omega}(u, v=0, 1 \ldots 7))$$

This defines the movement-compensated power spectrum of the DCT coefficient to the predicted error of each frame. In this case, (Vv,Vh) corresponds to an error of movement estimation. FIG. 4 shows some examples of spectra corresponding to an image of $\rho$=0.95. FIG. 4 is a drawing for energy spectra of movement-compensated prediction error DCT coefficients, and those three coordinates are vertical frequency (left side), horizontal frequency (right side), and spectrum amplitude (vertical). The movement shown is of a pixel/frame unit and corresponds to an estimated error of movement. The average of the spectrum amplitude is equal to the dispersion of a predicted error in signal space. The spectrum is found to concentrate characteristic coefficients corresponding to the movement.

The quantization is a nonlinear processing defined as follows.

$$\phi^2_{u,v} = \lambda_{u,v}^2 \quad \text{(only when } \phi^2_{u,v} > \lambda_{v,\omega}^2\text{)} \quad (12)$$

In formula (12), $$\lambda_{v, \omega}^2$$

is white noise dispersion introduced by quantization and quantization weight. The quantization noises are evaluated against dispersion (=1.0) of the original image signals. Specifically, the following equation is obtainable.

$$\text{Quantization} SNR = -10 \log \frac{\Sigma \phi^2_{u,v}}{64} \quad (dB) \quad (13)$$

Figure 5B:
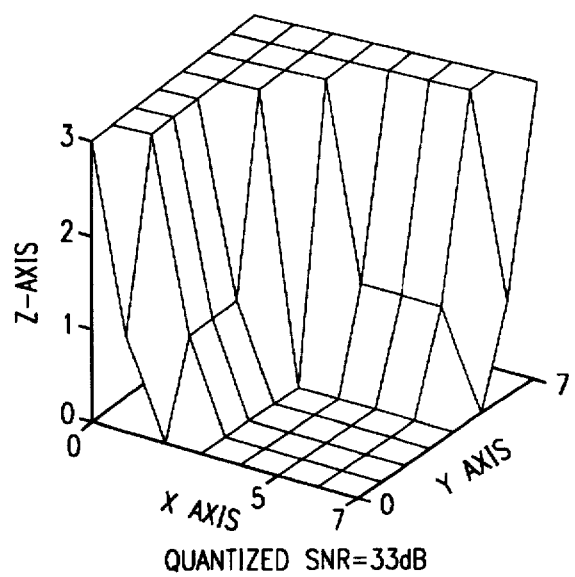
Figure 5C:
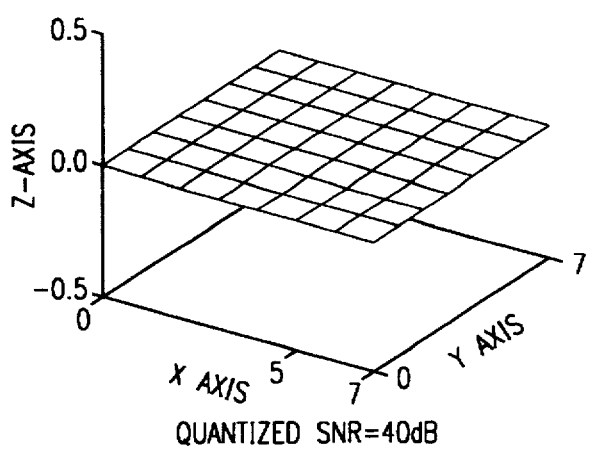

The quantization acts as a restricting action against the spectra shown in FIGS. 4(a)–4(c). FIGS. 5(a)–5(c) show examples for various quantized SNR (signal/noise ratio). FIGS. 5(a)–5(c) are drawings showing examples of quantized noise spectra, and only the cases of Vv=2 and Vh=2 are shown. If the quantization threshold value (step) is large, many high-frequency coefficients are smaller than the threshold value and forced to take a value of 0. As the quantization threshold value is lowered, more coefficients are quantized to non-zero. Therefore, it is covered by uniform quantized noises of $\lambda^2$.

Quantized noises in signal space can be calculated by substituting $\theta^2_{u,v}$ of Equation (8) with the noise spectra obtained as a result. As shown in Equation (7), if the quantized noises are uniform, as shown in FIG. 5(c), the quantized noises in signal space are similarly uniform, and consequently, one can do nothing to improve deencoded images except restoring overall images from those buried in white noises. However, as it is common among all highly efficient video compression devices, the quantization threshold value is far larger than the amplitude of many coefficients, and the quantized noise spectra are not uniform as shown in FIGS. 5(a) and 5(b). In most cases, quantized noises are distributed densely at specific sites inside a block, and other sites have less deterioration caused by noises. Therefore, it becomes possible to carry out effective improvement by restoring deencoded images. FIGS. 6(a)–6(f) show the results of some computations carried out on quantized noise distributions inside a block under various conditions.

The results obtained indicate that the quantized noises are concentrated at the block boundary when the image signal correlation coefficient is large (>0.5). Since it is so in many image signals, a lattice pattern is observed at the block boundary if the compression ratio is high. According to the results of certain research, the lattice pattern has been explained as a discrepancy in DC coefficients due to coarse quantization. In many cases, the DC coefficients are encoded with minimum losses, the theory is not correct. On the other hand, it has to be attributed to an increased level of white noises in a specific site inside a block. The white noises in this case are called mosquito noises in the field of image processing. When edges and high contrast outlines are moved, a large amount of quantized noises are generated at the outline portion of a block. However, if an edge or outline matches this portion, it cannot be recognized clearly. However, if they are away from the site by a certain distance, the noises appear as an effect as if mosquitoes are flying. On the other hand, the following equation is always valid as apparent from Equation (8).

$$\sigma_{m,n}^2 = \sigma_{7-m,n}^2 = \sigma_{m,7-n}^2 = \sigma_{7-m,7-n}^2 \quad (14)$$

Most image signals have positive correlation coefficients. However, if interlacing scanning is carried out, a zigzag pattern is generated at the boundary of an object, and as a result, a negative correlation coefficient is generated at that position. (In MPEG2, such a block is mostly encoded in a field mode, but there are still many similar cases.) In the case of positive correlation signals, the quantized noise spectrum is a simple decreasing function, but in the case of negative signals, it is a simple increasing function. Therefore, in the case of positive correlation signals, non-zero quantized coefficients have a tendency to distribute around (0,0) as shown in FIG. 6, but in the case of negative correlation signals, they are spread around (7,7). If the quantized threshold value (Qstep) is determined, the quantized noise spectrum can be estimated from limited (in the region A) coefficient localization (two- dimensional shape) by $(b_v, b_h)$ of the figure. This parameter is called non-zero coefficient localization (NZCL).

FIG. 7 is a drawing estimating the boundary between coefficients of groups A and B of FIG. 3, and it shows that the non-zero coefficient localization is an important parameter for noise reduction.

Figure 8:
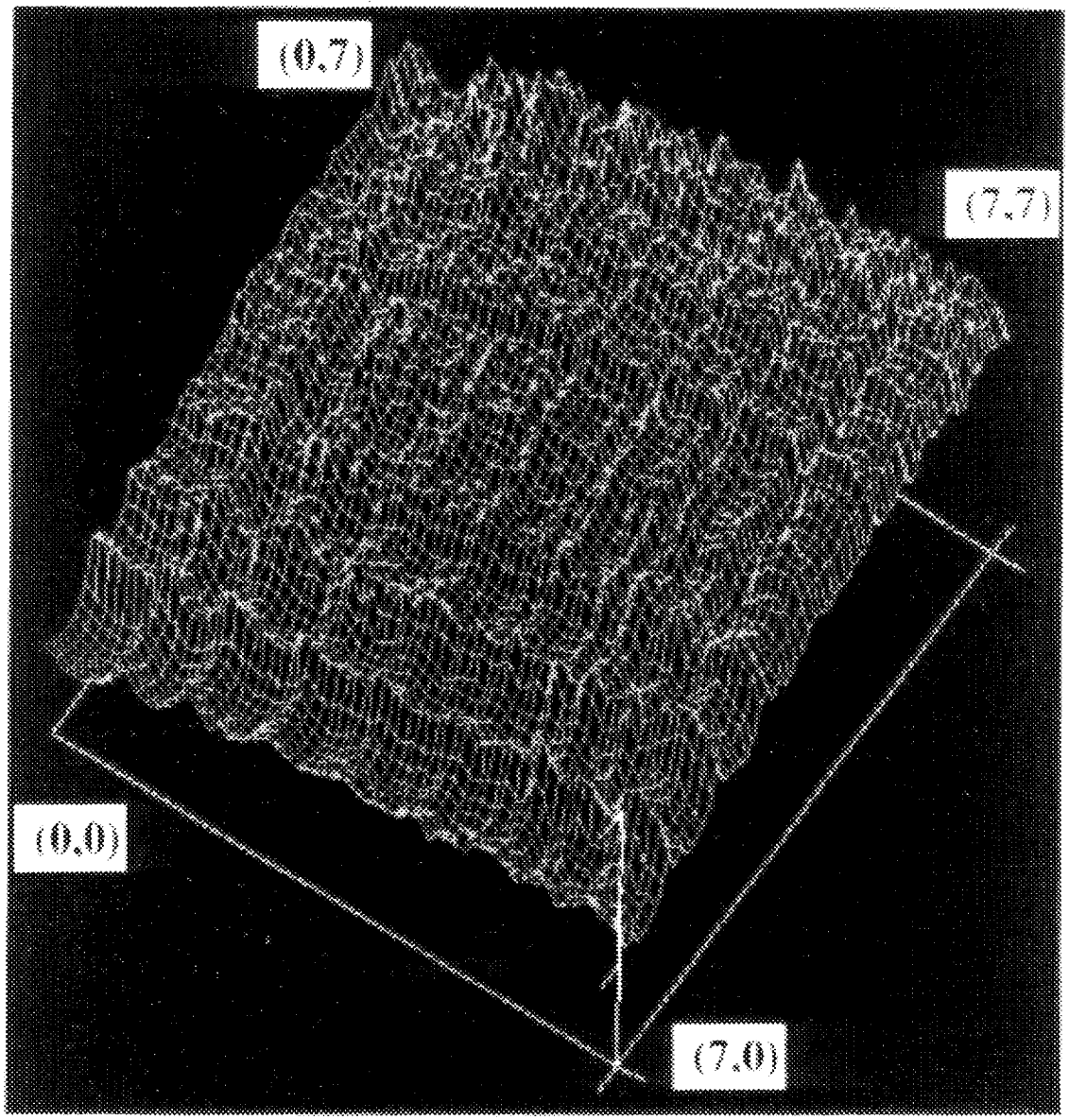
FIG. 8 is a schematic drawing showing mean noise dispersion of 8×8 blocks connected with NZCL as a parameter.

The NZCL parameter has a value between (0,0) and (7,7), and thus, there are 64 different possible values. When 8×8 blocks of an image are encoded, the related NZCL is confirmed immediately from the non-zero coefficient distribution. The noises of this block encoding can be easily calculated as a difference between the deencoded signals and original image signals. Therefore, by using NZCL, the encoding noises can be classified into 64 different cases. FIG. 8 is a drawing showing mean noise dispersion of 8×8 blocks connected with NZCL as a parameter. Each 8×8 block represents noise distribution in a certain block corresponding to the theoretical results shown in FIGS. 6(a)–6(f).

FIGS. 6(a)–6(f) are drawings showing quantized noises (dispersion) of deencoded blocks (8×8), and the quantized noises are concentrated at the block boundary when the correlation coefficient of the original signals is large (>0.5).

Figure 6A:
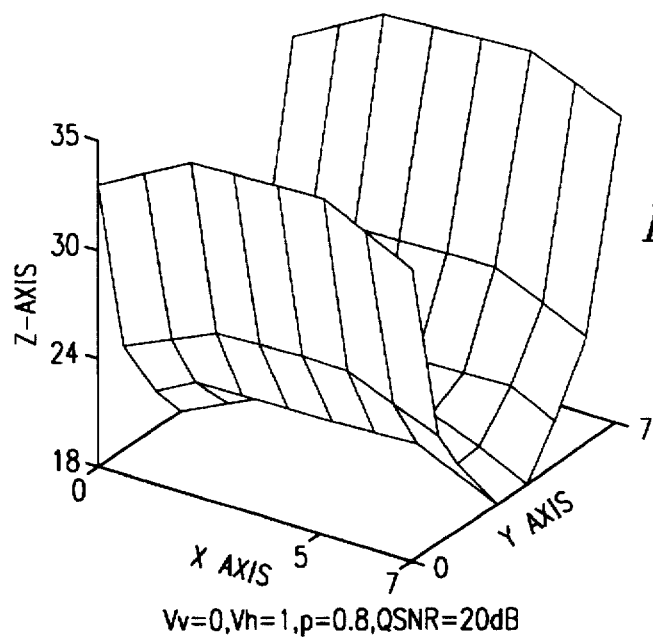
FIGS. 6(a)–6(f) are schematic drawings showing quantized noises (dispersion) of an encoded block.
Figure 6B:
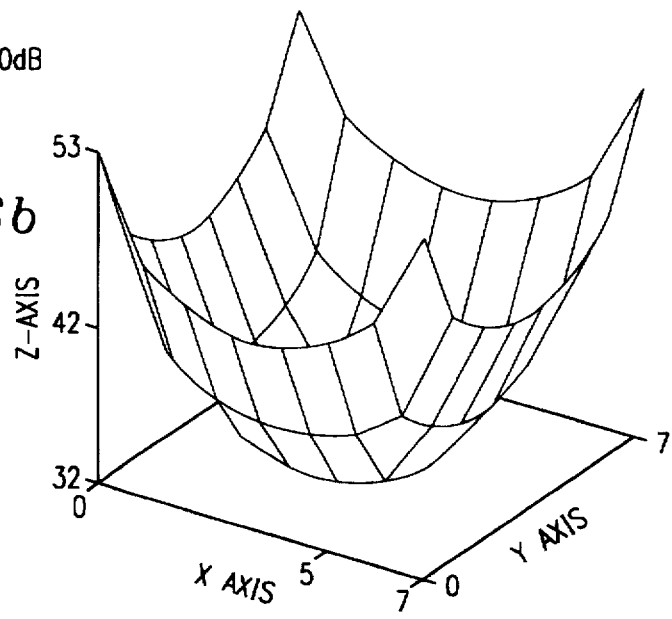
Figure 6C:
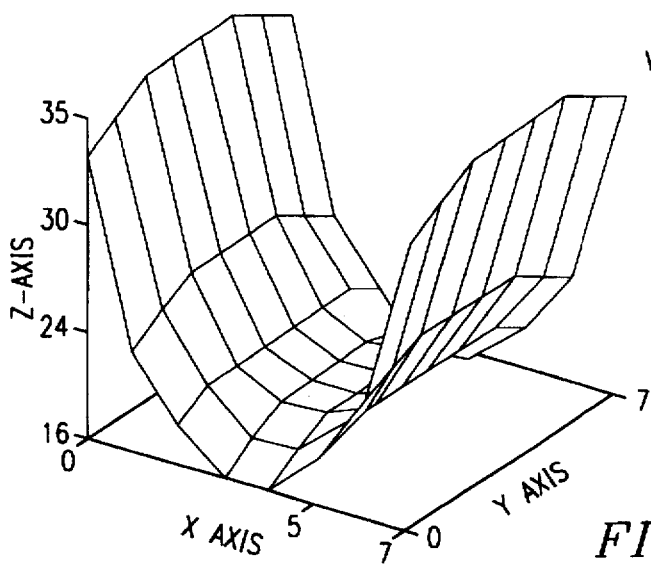
Figure 6D:
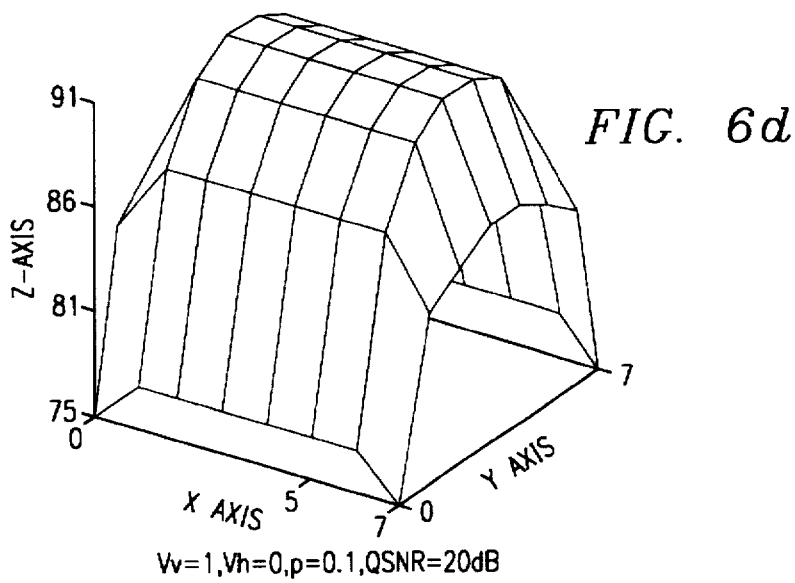
Figure 6E:
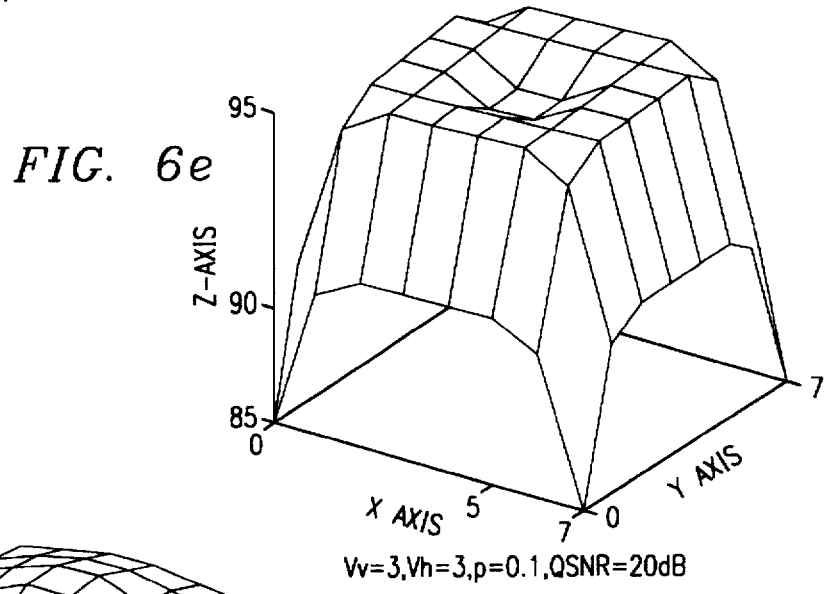
Figure 6F:
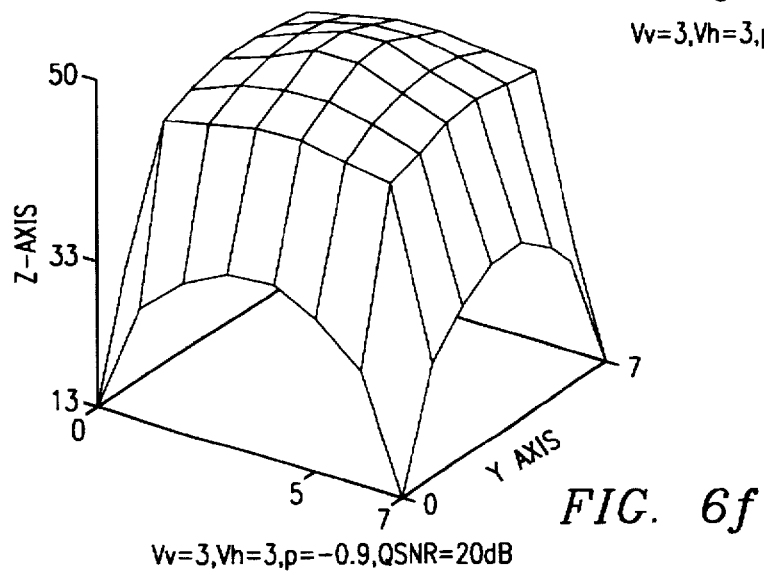

In accordance with the invention, the following interesting observations were made. If either $b_v$ or $b_h$ is less than 4 and:

(1) $b_v = b_h$, the encoded noises have the shape of FIG. 6(b),
(2) $b_v > b_h$, the encoded noises have the shape of FIG. 6(a),
(3) $b_v < b_h$, the encoded noises have the shape of FIG. 6(c), and both $b_v$ and $b_h$ are larger than 4, the encoded noises have the shape of FIG. 6(e) or 6(f). Therefore, if the NZCL parameter is disregarded, and all encoded noises are averaged, the noises appear to be distributed rather uniformly in the whole block (thus, the whole image). On the other hand, FIG. 8 shows the actual data determined by using 150 frames of mobile and calendar sequence, which is the standard test image of ISO/MPEG. The basic difference between the mobile and calendar sequence and other sequences is a difference in the quantization step and not in noise distribution. In the mobile and calendar sequence, the quantization step remains roughly constant (1015/255.4 Mbps).

Incidentally, FIG. 8 is an overall 64×64 picture, and the horizontal and vertical axes are shown by connected 8×8 blocks classified by using the NZCL parameter. The noise quantity is shown as a dispersion value.

The filter used to reduce noise is explained as follows.
The quantization process may be represented as follows.

$$Z = H(H^T X H + \Theta)H^T \quad (15)$$
$$= X + H\Theta H^T$$

In formula (15), X and Z are original and deencoded signals, $\Theta$ shows quantized noises, and H shows DCT conversion. Linearly arithmetic noises $H\Theta H^T$ are not correlated to X. If the signal dispersion is $S_{m,n}$ $\omega$, $\nu$, and the noise dispersion is $N_{m,n}$ $\omega$, $\nu$ Weiner filter is represented by the following equa Weiner filter is represented by the following equation.

$$\bar{X}_{m,n}(\omega, \upsilon) = \left| \frac{X_{m,n}(\omega, \upsilon)}{X_{m,n}(\omega, \upsilon) + N_{m,n}(\omega, \upsilon)} \right|^2 Z_{m,n}(\omega, \upsilon) \quad (16)$$

In formula (16), $X_{m,n}$ $\omega$, $\nu$ shows the power spectrum density of $X_{m,n}$. $N_{m,n}$ $\omega$, $\nu$ corresponds to the noise term $[H\Theta H^T]$ $(\omega, \nu)$ and, as explained in the previous section, it is determined from the NZCL information.

Figure 9:
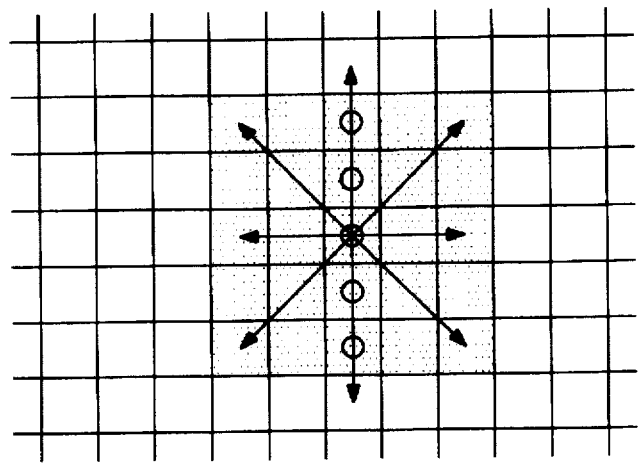
FIG. 9 is a schematic drawing of a filtering grid for explaining the filtering action to determine the minimum dispersion of $Z_{m,n}$.

To realize equation (16), $Z_{m,n}$ $\omega$, $\nu$ is processed first with a directional low-pass filter $DL(\omega, \nu)$, and the signals obtained as a result are allowed to contain most $X_{m,n}(\omega, \nu)$ or least $N_{m,n}(\omega, \nu)$. The equivalent procedure may be carried out by the one-dimensional filtering action in the direction of the minimum dispersion of $Z_{m,n}$. By the subsequent second stage filtering action, $DL(\omega, \nu)$ has to become a local filter extracting DC components of $Z_{m,n}$. Four separate directions are searched by determining the minimum dispersion of $Z_{m,n}$. FIG. 9 shows an example of a five-tap filter. In FIG. 9, the center position shows the pixel, the noises of which are to be removed by filtering, and the optimal one-dimensional direction for filtering searches for this pixel.

FIG. 9 shows a directional low-pass filter, and the filter coefficients are all ⅕ in this example of a five-tap filter. For 4 separate directions, the minimum residual dispersion is determined.

If a Weiner filter is applied, the following equation is obtained.

$$\bar{X}_{m,n}(\omega, \upsilon) = |DL(\omega, \upsilon)|^2 Z_{m,n}(\omega, \upsilon) + \quad (17)$$

$$\left| \frac{(Z_{m,n}(\omega, \upsilon) - N_{m,n}(\omega, \upsilon))}{Z_{m,n}(\omega, \upsilon)} \right|^2 |1 - DL(\omega, \upsilon)|^2 Z_{m,n}(\omega, \upsilon) =$$

$$|DL(\omega, \upsilon)|^2 Z_{m,n}(\omega, \upsilon) +$$

$$\left| F\left( \frac{A\sigma_{m,n}^2}{E((\delta z_{m,n})^2)} \right) \right|^2 |1 - DL(\omega, \upsilon)|^2 Z_{m,n}(\omega, \upsilon)$$

In formula (17), $\delta z_{m,n}$ is a high-pass component of $Z_{m,n}$. A is a normalized constant represented by the following equation when $DL(\omega, \nu)$ is a mean FIR filter (equal coefficient) of (2N+1) taps.

$$A = \frac{4}{(2N+1)^2} \int_{-x}^{K} \left| \sum_{i=1}^{N} \cos n\omega \right|^2 d\omega \quad (18)$$

In equation (17), the shape of the low-pass filter as a function of the ratio of $E[(\delta z_{m,n})^2]$ and $\sigma^2_{m,n}$ is hypothesized. Since $\sigma^2_{m,n}$ is a set value, the normalized constant A corrects the energy density value. If $\tau_{m,n} = A\sigma^2_{m,n}/E[(\delta z_{m,n})^2]$, the shape of the low-pass filter $f(\tau_{m,n})$ is optimized by simulation.

Figure 10:
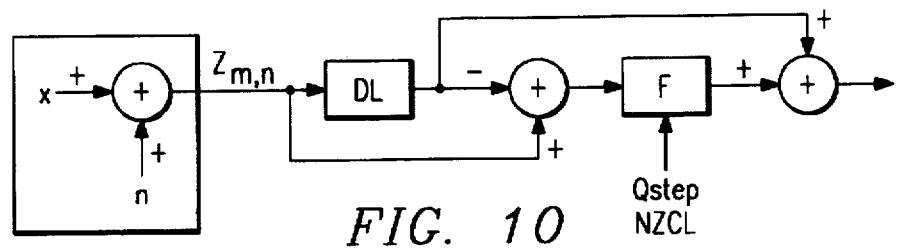
FIG. 10 is a schematic diagram of a filter structure used in an embodiment of this invention.

FIG. 10 shows one example of the overall filter structure. In this filter structure, DL is a directional low-pass filter as shown in FIG. 9. F is a Weiner filter. Its characteristics are determined by the size of Qstep and NZCL information, and it is similarly a low-pass filter. The broken line block shows a noise source. The signals $Z_{m,n}$ correspond to the output signals from the adder 7 in the embodiment of FIG. 1.

The low-pass filter F is an accommodation filter. In the case of coefficient block quantization, its Qstep and NZCL information can determine estimated quantized noises at respective pixel sites. If $\delta z_{m,n}$ is white, the optimal shape of F is represented by the following equation.

$$F = 1 - \tau_{m,n} = 1 - \frac{A\sigma_{m,n}^2}{E((\delta z_{m,n})^2)} \quad (19)$$

Figure 11:
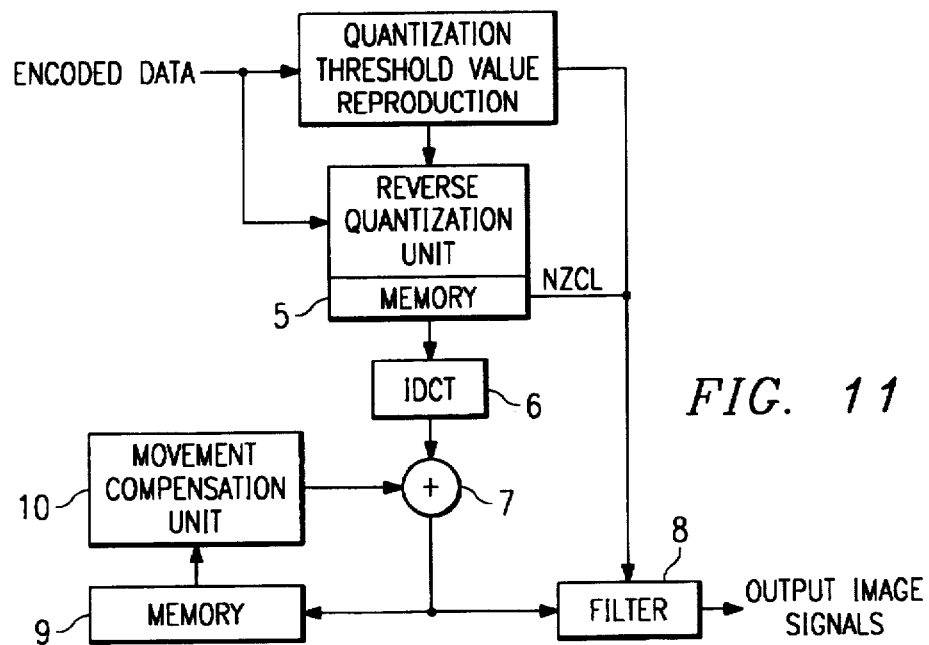
FIG. 11 is a block diagram of a deencoding unit of the image-processing system in another embodiment of this invention.

In this case, the size of Qstep is taken into consideration in $\sigma^2_{m,n}$ normalization. By using information obtained for noise size at each pixel site, a strong low-pass filtering action is applied to a flat image region having a large amount of noise, and a weak filtering action is applied to a high contrast region having a small amount of noise and edges. As a result, most characteristic DCT noises can be removed from the flat regions adjoining edges and outlines. On the other hand, if the filter is placed outside the encoding-deencoding loop, it can be constructed with a post filter (filter unit 8) to the deencoder as shown in FIG. 11. Furthermore, it may be inserted before the adder 7 inside the deencoding loop (after IDCT 6).

This new noise reducing filter is always applicable to deencoded images regardless of the kind (I, P, or B) of images. Furthermore, in the action of this new filter, no additional information to increase encoded data on the deencoder side is required. All information required can be extracted from the results of encoding, and the deencoder side can carry out synchronized processing with that of the encoder side.

As discussed above, it has been shown to be possible to remove or whiten characteristic noises met in the case of image compression based on DCT. The extent of quality improvement obtained as a result is significantly large. For the optimal design of noise reduction filters, it is necessary to consider both quantization and reverse DCT.

Although this invention has been described in connection with a specific embodiment, it will be understood that the scope of this invention is not necessarily limited to that embodiment.

According to this invention, an image processing system has been provided in which harmful noises at the time of image compression, such as mosquito and block noises, etc., can be effectively removed.

I claim:

1. An image processing system comprising:

means for inputting m pixels×n lines of image information;

first transformation means connected to said input means for receiving the image information therefrom and transforming the image information into data represented in the frequency domain;

quantization means connected to said first transformation means for receiving the transformed frequency domain data therefrom and forming quantized data based upon the frequency domain data as transformed by the first transformation means;

reverse quantization means connected to said quantization means for receiving the quantized data therefrom and performing a reverse quantization on the quantized data to provide reverse quantized frequency domain data, said reverse quantization means generating a distribution pattern of non-zero transform coefficients related to the reverse quantized frequency domain data provided thereby and being a specific value at each position of the (m×n) positions;

second transformation means connected to the reverse quantization means for receiving the reverse quantized frequency domain data therefrom and transforming the reverse quantized frequency domain data into reconverted image information; and filtering means connected to said reverse quantization means and to said second transformation means for receiving the reconverted image information from said second transformation means and filtering the reconverted image information in accordance with the distribution pattern of the non-zero transform coefficients generated by said reverse quantization means, so that the amount of compression noise can be estimated at each position of the (m×n) positions whereby mosquito and block noise is removed from the reconverted image information.

2. An image processing system as set forth in claim 1, further including memory means connected to said filtering means for receiving the filtered reconverted image information therefrom and storing the filtered reconverted image information;

movement compensation means connected to said memory means for accessing the filtered reconverted image information therefrom;

an adder having first and second inputs and an output, said adder being connected between said second transformation means and said filtering means with the first input of said adder being connected to said second transformation means, and the output of said adder being connected to said filtering means; and said movement compensation means having an output connected to the second input of said adder.

3. An image processing system as set forth in claim 1, wherein said filtering means is connected to said quantization means for receiving a quantization threshold value therefrom.

4. An image processing system comprising:

means for inputting encoded image information representative of m pixels×n lines of image information as data represented in the frequency domain;

quantization means for receiving the encoded frequency domain data and forming quantized data based thereon;

reverse quantization means connected to said quantization means for receiving the quantized data therefrom and performing a reverse quantization on the quantized data to provide reverse quantized frequency domain data, said reverse quantization means generating a distribution pattern of non-zero transform coefficients related to the reverse quantized frequency domain data provided thereby and being a specific value at each position of the (m×n) positions;

transformation means connected to the reverse quantization means for receiving the reverse quantized frequency domain data therefrom and transforming the reverse quantized frequency domain data into decoded image information; and filtering means connected to said reverse quantization means and to said transformation means for receiving the decoded image information from said transformation means and filtering the decoded image information in accordance with the distribution pattern of the non-zero transform coefficients generated by the reverse quantization means, so that the amount of compression noise can be estimated at each position of the (m×n) positions whereby mosquito and block noise is removed from the decoded image information.

5. An image processing system as set forth in claim 4, further including memory means connected to said filtering means and to said transformation means for receiving the filtered decoded image information from said filtering means and storing the filtered decoded image information;

movement compensation means connected to said memory means for accessing the filtered decoded image information therefrom;

an adder having first and second inputs and an output, the first input of said adder being connected to said transformation means, and the output of said adder being connected to said filtering means and to said memory means; and said movement compensation means having an output connected to the second input of said adder.

6. An image processing system as set forth in claim 4, wherein said filtering means is connected to said quantization means for receiving a quantization threshold value therefrom.

7. A method for removing mosquito and block noise from compressed video signals providing image information, said method comprising:

transforming image information arranged in m pixels and n lines into data represented in the frequency domain;

quantizing the frequency domain data to form quantized data based thereon;

reverse quantizing the quantized data formed by the quantizing of the frequency domain data to produce reverse quantizing data;

forming a distribution pattern of non-zero transform coefficients related to the reverse quantized frequency domain data provided thereby and being a specific value at each position of the (m×n) positions as the reverse quantizing of the quantized data occurs;

reverse transforming the reverse quantized data to provide reconverted image information; and removing mosquito and block noise from the reconverted image information by filtering the reconverted image information in accordance with the distribution pattern of the non-zero transform coefficients so that the amount of the noise can be estimated at each position of the (m×n) positions.

8. A method as set forth in claim 7, wherein the removal of mosquito and block noise from the reconverted image information is accomplished in plural filtering stages including filtering the reconverted image information with a directional low-pass filter in a first filtering stage; and filtering the reconverted image information with an accommodation Wiener filter in a second filtering stage.

* * * * *